US006493326B1

(12) United States Patent
Ramachandran

(10) Patent No.: US 6,493,326 B1
(45) Date of Patent: Dec. 10, 2002

(54) METHOD AND APPARATUS FOR SAVING POWER DURING PUNCTURED TRANSMISSION OF MOBILE COMMUNICATIONS

(75) Inventor: Bala Ramachandran, Irvine, CA (US)

(73) Assignee: Skyworks Solutions, Inc., Newport Beach, CA (US)

( * ) Notice: Subject to any disclaimer, the term of this patent is extended or adjusted under 35 U.S.C. 154(b) by 0 days.

(21) Appl. No.: 09/205,523

(22) Filed: Dec. 3, 1998

(51) Int. Cl.$^7$ .......................... G08C 17/00; H04B 7/216
(52) U.S. Cl. .................... 370/311; 370/342; 340/7.32; 455/574
(58) Field of Search ................................ 370/342, 311; 340/7.32; 455/127, 343, 574

(56) References Cited

U.S. PATENT DOCUMENTS

| 5,659,569 | A | * | 8/1997 | Padovani et al. | ............ 370/479 |
| 5,949,812 | A | * | 9/1999 | Turney et al. | ............... 370/311 |
| 6,278,703 | B1 | * | 8/2001 | Neufeld | ....................... 370/337 |
| 6,289,228 | B1 | * | 9/2001 | Rotstein et al. | ............ 340/7.32 |

FOREIGN PATENT DOCUMENTS

| JP | 57159131 A | 10/1982 |
| WO | WO 9313516 A | 7/1993 |
| WO | WO 9740593 A | 10/1997 |

* cited by examiner

*Primary Examiner*—Hassan Kizou
*Assistant Examiner*—Tim Spafford
(74) *Attorney, Agent, or Firm*—Knobbe, Martens, Olson & Bear, LLP

(57) ABSTRACT

A method and apparatus for saving power during punctured transmission in a CDMA mobile communication system. The apparatus comprises a baseband device, a mixed signal portion, a radio frequency (RF) frontend and a power supply. The baseband device comprises a variable rate voice coder (vocoder) which reduces the rate of voice data transmission to the mixed signal portion when voice activity by a user is low during a two-way conversation. When the rate of voice data transmission is reduced, there are one or more periods in which no voice data is transmitted. The system provides a signal from the baseband device to power OFF certain portions of the mixed signal portion during the periods of transmission with no voice data. This reduces the amount of power consumed by the mixed signal portion and enhances the life of the power supply.

18 Claims, 4 Drawing Sheets

METHOD AND APPARATUS FOR SAVING POWER DURING PUNCTURED TRANSMISSION OF MOBILE COMMUNICATIONS

BACKGROUND OF THE INVENTION

1. Field of the Invention

The present invention relates generally to electrical devices. Specifically, the present invention relates to a method and apparatus for saving power during punctured transmission in a mobile communication system.

2. Brief Description of the Related Art

The three major types of multiple access networks are frequency division multiple access (FDMA), time division multiple access (TDMA) and code division multiple access (CDMA). In a CDMA system, various users share the same frequency and the same time slot. The users are distinguished (channelized) from each other by assigned code sequences, such as orthogonal codes or pseudorandom noise (PN) codes. Each receiver in a CDMA system separates the transmitted signals from a base station by using a correlator that accepts only signal energy designated to a particular user. Undesired signals constitute noise. A receiver in a CDMA system must filter out these undesired signals.

By transmitting at the same time and sharing the same frequency, the users constitute mutual interference to each other. A CDMA transmitter of one user may substantially reduce the interference generated by the transmitter by reducing the transmission rate when the user's voice activity is low. When the transmission rate is reduced, there are intermittent bursts (periods or groups) when no voice data is transmitted.

An important factor in designing new mobile communication handsets is saving power, which directly affects the battery life and the 'talk time' of the handset. As smaller form factors limit the size and type of components used, including battery cells, power savings is becoming more critical in current wireless communication devices.

SUMMARY OF THE INVENTION

IS-95 is a digital standard or protocol for CDMA cellular system operation. IS-98 is a test standard derived from the IS-95 standard for CDMA mobile stations. IS-95 CDMA mobile communication systems enhance the capacity of the network and save power in the handset by taking advantage of the nature of human speech. In CDMA systems, voice or speech activity is not always present during a two-way conversation. Statistically, in a two-way conversation, the voice activity from one side (voice activity factor) in a full duplex, CDMA system commonly only comprises 40% or less of the total speech time. For the remainder of the speech time, there is no voice activity from one side and no information being transmitted from that side.

In general, a mobile communication handset commonly comprises a radio frequency (RF) frontend portion, a mixed signal portion or interface, a baseband device, a microphone and a speaker. In existing CDMA handsets, a voice coder (vocoder) reduces the rate of voice data transmission when there are pauses in a user's speech. The reduction in the transmission rate creates intermittent bursts in the baseband device when no voice data is transmitted.

To save power on a mobile handset, it is desirable to momentarily and selectively power OFF certain portions of the handset during an intermittent burst in the baseband device when no voice data is transmitted. In existing IS-95 CDMA systems, the handset powers OFF certain components of the RF frontend portion, such as a power amplifier (PA) and other drivers, during an intermittent burst in the baseband device when no voice data is transmitted. The handset powers the components back ON when there is a burst with voice data to be transmitted. But the remainder of the RF frontend portion, such as a mixer and variable gain amplifiers (VGAs), and the mixed signal portion are always ON in existing systems.

The present invention uses a signal or command to selectively power (gate) OFF and ON certain components of the mixed signal portion during intermittent bursts in the baseband device with no transmitted voice data. In one embodiment, these components include a digital-to-analog converter (DAC), one or more switched capacitor filters, and one or more continuous time smoothing filters. In one embodiment, a burst in the baseband device is 1.25 milliseconds long in a 20 msec frame. In one embodiment, the signal is based on a command from a modem inside the baseband device. In another embodiment, the signal is generated by a voice coder (vocoder) inside the baseband device. In another embodiment, the signal is generated by a vocoder outside the baseband device. In one embodiment, the signal is generated by a processor inside the baseband device.

The present invention saves significant amounts of power and thereby increases talk time. Because the voice activity factor is typically 0.40 or 40% or less, the present invention can save approximately 60% of the power consumed by certain components in the mixed signal portion.

DETAILED DESCRIPTION OF THE PREFERRED EMBODIMENT

Although the embodiments of the present invention are described below for a CDMA system, the present invention may be implemented in a FDMA, TDMA or other communication system. In a FDMA system, the users do not share frequency bands, and in a TDMA system, the users do not share time slots. As a result, there is a time delay in FDMA and TDMA systems associated with reassigning the channel resources during pauses in speech. This time delay makes it difficult to obtain the same efficiency gains as a CDMA system. In a CDMA system, all the users share the same frequency and time slots. There is no time delay associated with reassigning channel resources. Thus, it is possible to reduce the transmission rate during pauses in speech. When the transmission rate is reduced, certain portions of a mobile handset may be powered OFF (deactivated) during intermittent bursts within the baseband device with no transmitted voice data.

Figure 1:
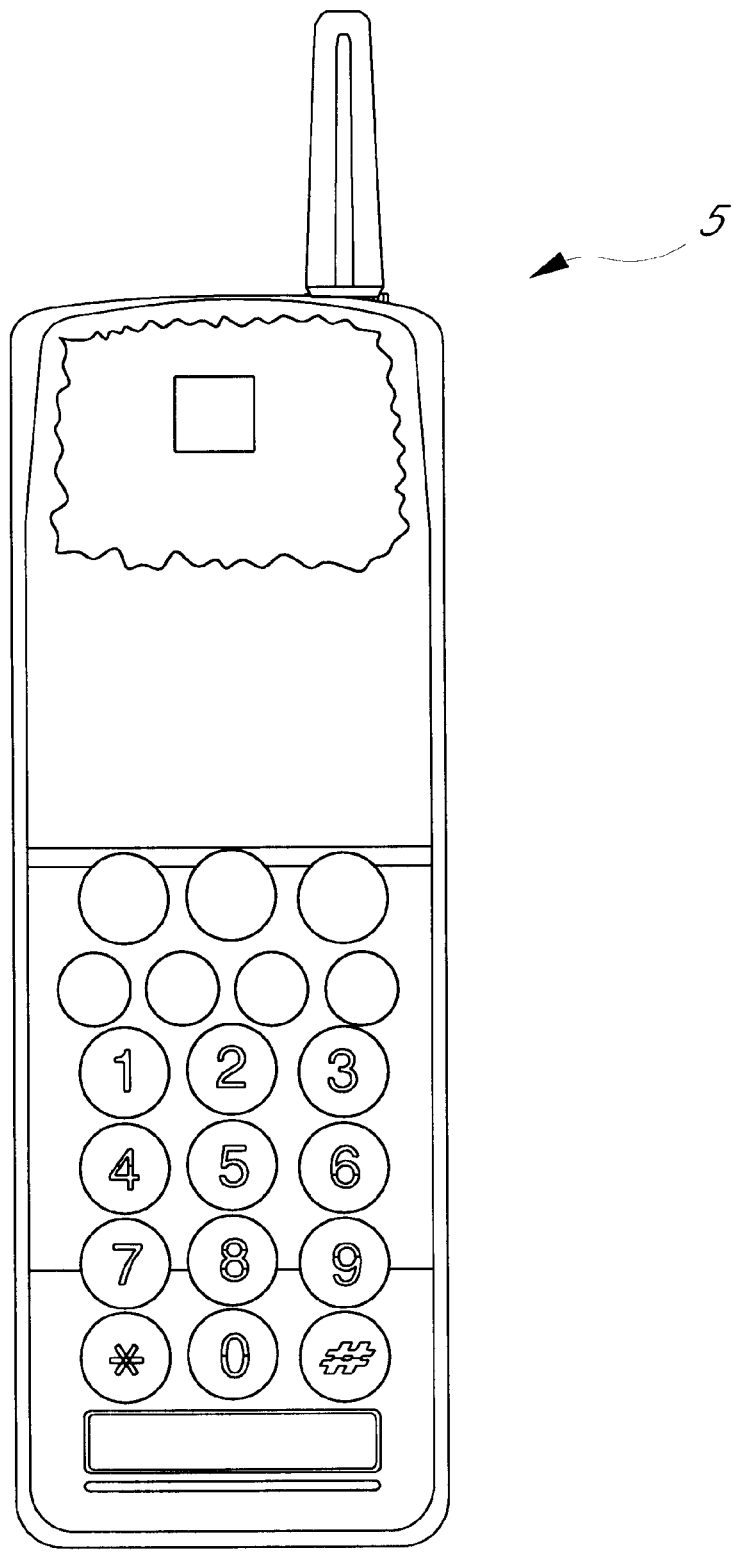
FIG. 1 illustrates a one embodiment of a wireless communication handset.
Figure 2:
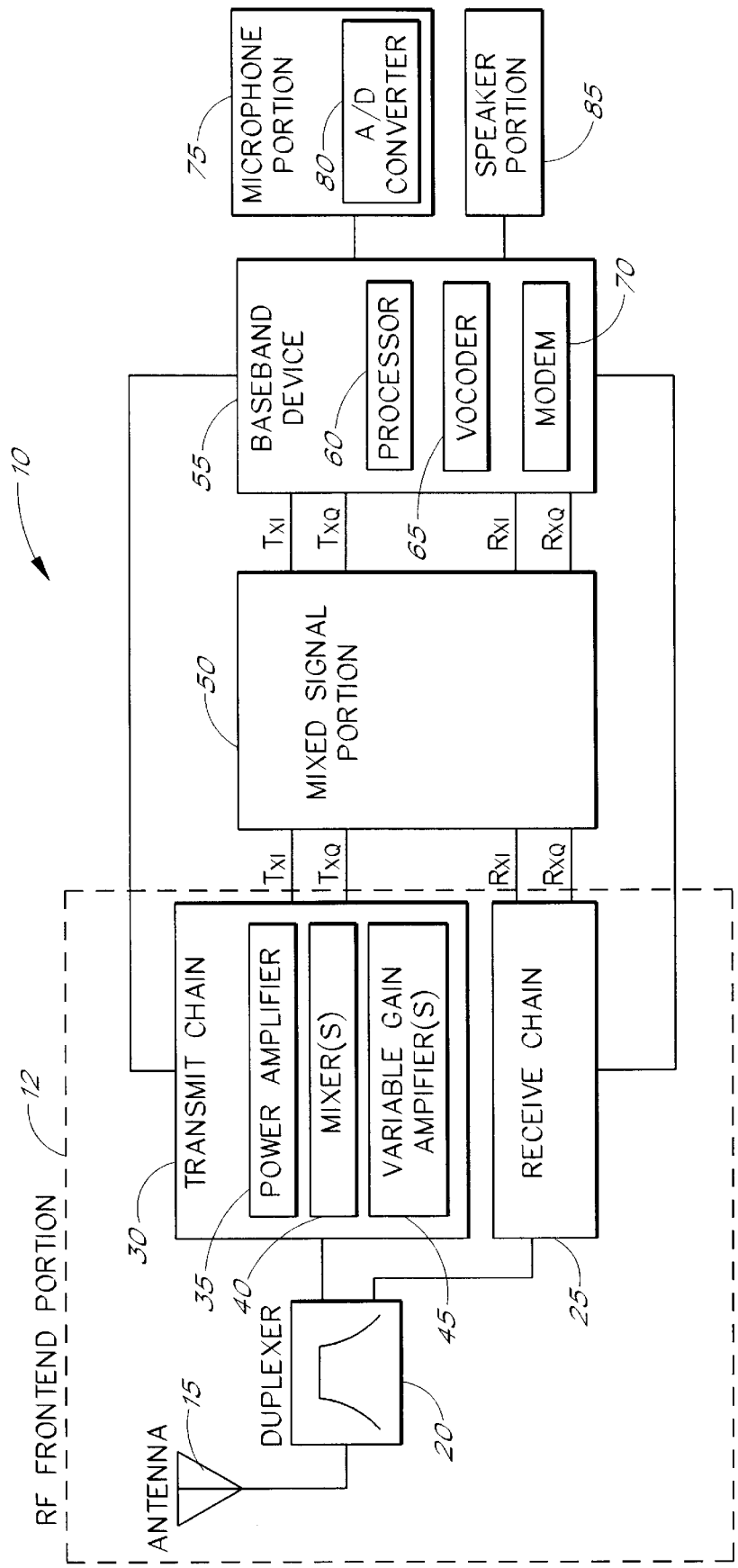
FIG. 2 illustrates one embodiment of a set of internal components in the handset of FIG. 1 in accordance with the present invention.

FIG. 1 illustrates one embodiment of a wireless communication device or handset 5 in accordance with the present invention. FIG. 2 illustrates one embodiment of a set of internal components in the handset 5 of FIG. 1. In FIG. 2, the handset 5 comprises a radio frequency (RF) frontend portion 12, a mixed signal portion 50, a baseband device 55, a microphone portion 75 and a speaker portion 85. The RF frontend portion 12 comprises an antenna 15, a duplexer 20, a receiver or receive chain 25, and a transmitter or transmit chain 30. The transmit chain 30 comprises one or more power amplifiers (PA) 35, one or more mixers 40, and one or more variable gain amplifiers (VGAs) 45.

The baseband device 55 comprises a digital baseband processor 60, a voice coder (vocoder) 65 and a modem 70. In another embodiment, the vocoder 55 may be outside the baseband device 55 and in communication with the baseband device 55. The baseband device 55 may comprise other controllers, vocoders and man-machine interfaces (MMI). The microphone portion 75 comprises an analog-to-digital (A/D) converter 80. In another embodiment, the microphone portion 75 comprises a codec, which has both an A/D and a D/A converter.

In FIG. 2, the component configuration of the handset 5 is a general architecture used in wireless telephones. In other embodiments, the handset 5 may comprise additional amplifiers, drivers, filters, controllers, processors, feedback loops, memory or other devices. One of ordinary skill in the art will appreciate that FIG. 2 is an exemplary embodiment of a handset 5 and that other handset embodiments may be used in accordance with the present invention.

In general, the A/D converter 80 within the microphone portion 75 converts an analog voice signal to a digital signal. The baseband device 55 interfaces with the microphone 75. The vocoder 65 encodes the baseband data and feeds it to the mixed signal portion 50 via the modem 70. The vocoder 65 compresses (encodes) the high rate digital voice signal from the A/D converter 80 to a lower bit rate in order to reduce bandwidth.

Figure 3:
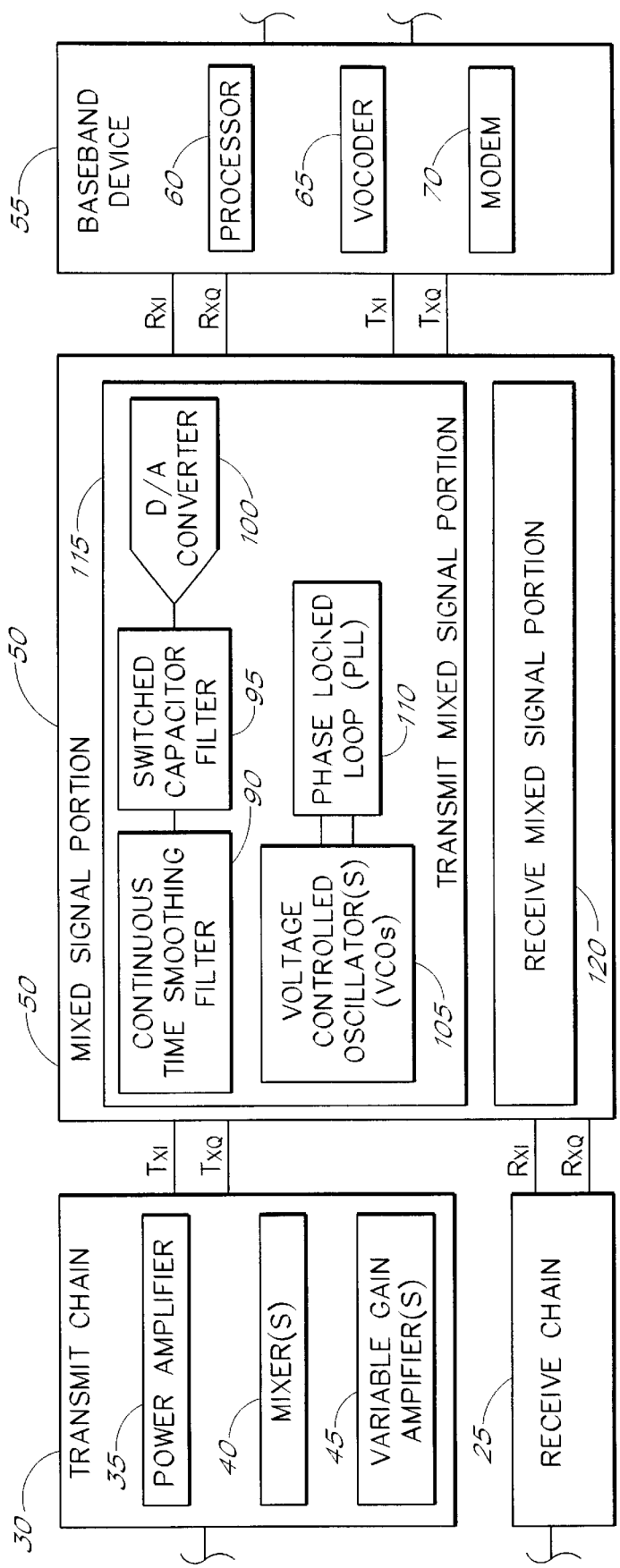
FIG. 3 illustrates a portion of the internal components of FIG. 2.

FIG. 3 illustrates a portion of the handset components of FIG. 2. The mixed signal portion 50 comprises a transmit mixed signal portion 115 and a receive mixed signal portion 120. The transmit mixed signal portion 115 comprises a digital-to-analog (D/A) converter 100, a switched capacitor filter 95, a continuous time smoothing filter 90, a phase-locked loop (PLL) 110 and one or more voltage controlled oscillators (VCOs) 105. In one embodiment, the mixed signal portion 50 is an RF 252 model manufactured by Rockwell Semiconductor Systems, Inc. in Newport Beach, Calif.

The D/A converter 100 converts digital baseband data from the baseband device 55 to an analog signal. This analog signal is filtered by the switched capacitor filter 95 and the continuous time smoothing filter 90 to meet spectral masks. The PLL 110 and the VCO 105 generate a second intermediate frequency (IF) signal for the transmit chain 30.

Figure 4:
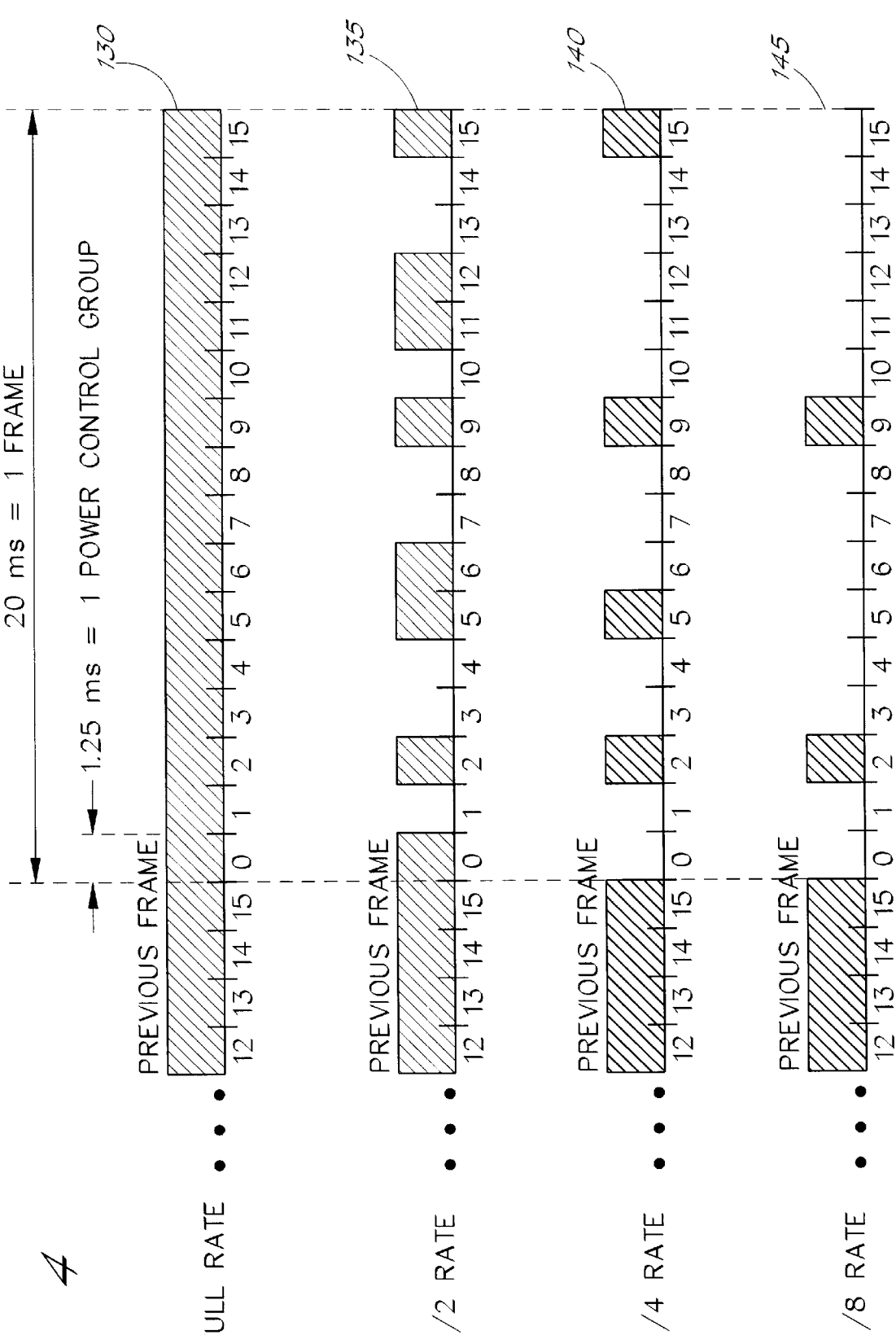
FIG. 4 illustrates a set of frames of reverse link information used by the handset of FIG. 1.

FIG. 4 illustrates a set of frames of reverse link information within the baseband device 55. The information within these frames is ultimately transmitted by a mobile unit, such as the handset 5 in FIG. 1, to a base station (not shown). In IS-95 based systems, the reverse link information from the vocoder 65 is grouped into frames of 20 milliseconds in duration. As shown in FIG. 4, every 20 msec frame is divided into 16 groups called power control groups (PCGs). Each PCG is 1.25 msec in duration.

The use and operation of the present invention is described with reference to FIGS. 1–4. In a preferred embodiment, the vocoder 65 is a variable rate vocoder which can operate at one of four rates depending on the level of a person's speech activity (voice activity factor). Other vocoders may be used which have less than four or more than four rates of operation. The variable rate vocoder 65 takes advantage of low speech activity from the user side by transmitting data to the modem 70 at a lower rate. For example, if there are more pauses in a person's speech, the voice activity factor is lower, and the vocoder 65 lowers the transmitted data rate.

The original purpose of reducing the rate of transmission is to reduce the amount of interference generated by an individual handset 5. The reduction in the transmission rate creates intermittent bursts (periods) with no voice data.

The variable rate vocoder 65 lowers the transmitted data rate to one-half, one-fourth or one-eighth of the full rate, depending on the voice activity factor. In one embodiment, the vocoder 65 uses the full rate when speech activity is high and uses the one-eighth rate when speaker activity is absent. The one-half and one-fourth rates are used for transition periods between speech and silence.

In FIG. 4, for an information frame 130 within the baseband device 55 transmitted at full rate, all 16 of the PCGs in the frame 130 contain voice data. When the vocoder 65 lowers the transmitted data rate within the baseband device 55 to one-half, one-fourth or one-eighth of the full rate, then only eight, four, or two of the 16 PCGs respectively are transmitted. The rest of the PCGs in the frame are not transmitted. For any frame transmitted at less than fill rate, the PCGs which contain voice data are randomly spaced in the frame within the baseband device 55. One of ordinary skill in the art will appreciate that the random spacing of the PCGs is determined by a number of factors, such as the IS-95 standard, the voice activity of the user, and the design of the baseband device 55.

For example, for a frame 140 in FIG. 4 transmitted within the baseband device 55 at one-fourth of the full rate, only four out of the 16 PCGs contain voice data which is transmitted. These four PCGs are randomly distributed within the frame 140. In FIG. 4, the second PCG, the fifth PCG, the ninth PCG, and the fifteenth PCG of the frame 140 contain voice data and are transmitted. The remaining PCGs may contain redundant or unused data, and they are not transmitted. Because the PCGs which contain voice data are randomly spaced in frames transmitted at less than the full rate, various frame configurations are possible but are not shown in FIG. 4.

One of the advantages of using a reduced, data transmission rate in a CDMA system is the potential to save power. In a preferred embodiment of the present invention, the transmit mixed signal portion 115 is momentarily powered OFF during a PCG when there is no data being transmitted. In one embodiment with a Rockwell RF 252 mixed signal portion, the transmit mixed signal portion 115 consumes approximately 6–7 milliAmps. Thus, the handset 5 reduces power consumption by 6–7 milliAmps when it momentarily powers OFF the transmit mixed signal portion 115 during every PCG when there is no voice data to be transmitted.

To save power, the transmit mixed signal portion 115 is gated ON and OFF by a signal or command from the baseband device 55. The signals associated with the handset 5 is described with reference to FIGS. 2–3. In one embodiment, the transmitter 30 is first switched ON during a traffic channel substate mode (defined in IS-95 as the time when both the transmitter 30 and the receiver 25 are ON simultaneously). Specifically, the transmit chain 30 and the transmit mixed signal portion 115 are first powered ON by a start signal, such as an IDLE/ signal. In one embodiment, the same signal may be used to power ON the receive chain 25 and the receive mixed signal portion. In one embodiment, the IDLE/ signal makes a '1' (high) to '0' (low) transition. One of ordinary skill in the art will appreciate that the signals described below in accordance with the present invention may be activated (or deactivated) by making a '1' to '0' transition or a '0' to '1' transition.

After the start signal powers ON the transmit chain 30 and the transmit mixed signal portion 115, the digital baseband processor 60 or the modem 70 generates a signal, such as a PA_TURN_OFF signal, when the vocoder 65 switches to one-half, one-fourth or one-eighth rate. The PA_TURN_OFF signal is then deactivated if the vocoder 65 switches back to the full rate.

Another signal, based or derived from the PA_TURN_OFF signal, indicates when data in a particular PCG is ready to transmit. In one embodiment, this derived signal is a general purpose input output (GPIO) signal from the digital baseband processor 60. In another embodiment, the GPIO signal is generated by the modem 70. In one configuration, the GPIO signal makes a low-to-high transition when there is data ready to transmit in a particular PCG. The GPIO signal makes a corresponding high-to-low transition when there is no data to be transmitted in a PCG. This GPIO signal is used to gate the transmit mixed signal portion 115 of the mixed signal device 50 ON and OFF. In a preferred embodiment, the GPIO signal is an ANALOG_TURN_ON signal.

In another embodiment, after the IDLE/ signal is activated and when voice activity is random, a MASK_DATA signal powers ON and OFF the transmit mixed signal portion 115 during PCGs with no transmitted voice data. 'Mask' in this sense means a PCG is masked because there is no voice data in that PCG to be transmitted. In one configuration, the mixed signal portion 50 is powered OFF when the MASK_DATA signal changes from '0' to '1'. The MASK_DATA signal allows sufficient lead time for the power amplifier 35 to warm up.

This lead time meets the gated output power mask defined by IS-95. The gated output power mask is the time for a transmitter signal at the antenna 15 to reach its final value after being commanded to power ON. The gated output power mask also defines a certain noise floor (20 dB) below the transmitter signal when the transmit chain 30 is powered OFF. In the present embodiment, the allowed gated output power mask time is 7 microseconds. If the settling time of the analog filters (continuous time smoothing filter 90 and switched capacitor filter 95) is within 1 microsecond, and the settling time of the D/A converters is 0.5–1 microsecond, the combined settling time is 1.5 to 2 microseconds. In other embodiments, the combined settling time may be as high as 4 microseconds. Because 2 or 4 microseconds is less than 7 microseconds, the gated output power mask can be met without settling time issues.

In another embodiment, the vocoder 65 generates the signal used to gate the transmit mixed signal portion 115 ON and OFF during the presence and absence of voice activity to be transmitted in a particular PCG. In another embodiment, the vocoder 65 is outside the baseband device 55, and there are two signals: one signal generated by the baseband device 55 and one signal generated by the vocoder 65. Either signal may be used to gate the transmit mixed signal portion 115 ON and OFF.

The present invention uses an internal signal within a wireless handset to power ON and OFF certain components of the mixed signal portion 50 during intermittent periods with no voice data transmission. The present invention reduces the amount of power consumed by the mixed signal portion and enhances the life of the handset's battery. By enhancing the life of the battery, the present invention allows a user to enjoy a longer 'talk time' on the handset.

While embodiments and applications of this invention have been shown and described, it will be apparent to those skilled in the art that various modifications are possible without departing from the scope of the invention. It is, therefore, to be understood that within the scope of the appended claims, this invention may be practiced otherwise than as specifically described.

What is claimed is:

1. A mobile communication system with a radio frequency (RF) frontend, a mixed signal portion, and a baseband device, said mobile communication system comprising:

a signal generated by the baseband device to the mixed signal portion, said signal causing one or more components of the mixed signal portion to power OFF during at least one period when no voice activity is transmitted, said signal causing said one or more components of the mixed signal portion to power ON during at least one period of transmission with voice activity.

2. The mobile communication system of claim 1, wherein the system uses Code Division Multiple Access (CDMA).

3. The mobile communication system of claim 1, wherein the periods when no voice activity is transmitted are power control groups (PCGs) of 1.25 milliseconds in duration.

4. The mobile communication system of claim 1, wherein said signal is generated by a processor associated with the baseband device.

5. The mobile communication system of claim 1, wherein said signal is generated by a modem associated with the baseband device.

6. The mobile communication system of claim 1, wherein said signal is generated by a voice coder (vocoder) associated with the baseband device.

7. The mobile communication system of claim 6, wherein the vocoder is a variable rate vocoder capable of transmitting voice data at more than one rate.

8. The mobile communication system of claim 7, wherein the variable rate vocoder is capable of transmitting voice data at one-half, one-fourth, and one-eighth of a full rate of transmission when voice activity by a user is low.

9. The mobile communication system of claim 1, wherein said one or more components of the mixed signal portion powered ON and OFF comprises a digital-to-analog converter.

10. The mobile communication system of claim 1, wherein said one or more components of the mixed signal portion powered ON and OFF comprises a switched capacitor filter.

11. The mobile communication system of claim 1, wherein said one or more components of the mixed signal portion powered ON and OFF comprises a continuous time smoothing filter.

12. The mobile communication system of claim 1, wherein said one or more components of the mixed signal portion powered ON and OFF comprises a phase locked loop.

13. The mobile communication system of claim 1, wherein said one or more components of the mixed signal portion powered ON and OFF comprises a voltage controlled oscillator.

14. A mobile communication device with a radio frequency (RF) frontend, a mixed signal portion, a baseband device, and a vocoder, said mobile communication system comprising:

a signal generated by the vocoder to the mixed signal portion, said signal causing one or more components of the mixed signal portion to power off during at least one period of transmission with no voice activity, said signal causing said one or more components of the mixed signal portion to power on during at least one period of transmission with voice activity.

15. A wireless communication device with a radio frequency (RF) frontend, a mixed signal portion, and a baseband device, said mobile communication system comprising:

a signal generated by the baseband device to the mixed signal portion, said signal causing one or more components of the mixed signal portion to power OFF during at least one period with no voice activity transmission, said signal causing said one or more components of the mixed signal portion to power ON during at least one period of transmission with voice activity.

16. The wireless communication device of claim 15, wherein the wireless communication device is a cellular telephone.

17. The wireless communication device of claim 15, wherein the wireless communication device is a cordless telephone.

18. A method of saving power in a mobile communication handset with a baseband device, a mixed signal portion and a radio frequency (RF) frontend, said method comprises:

reducing a rate of transmission of voice data from the baseband device to the mixed signal portion;

generating a signal to power OFF one or more components of the mixed signal portion during at least one period with no voice activity transmission; and generating a signal to power ON said one or more components of the mixed signal portion during at least one period of transmission with voice activity.

* * * * *